United States Patent

[11] 3,586,348

[72] Inventor Maurice E. Rich, Jr.
  Memphis, Tenn.
[21] Appl. No. 761,399
[22] Filed Sept. 17, 1968
[45] Patented June 22, 1971
[73] Assignee Troxel Manufacturing Company
  Moscow, Tenn.

[54] BICYCLE SIGN - SEAT BRACE MEANS
  2 Claims, 11 Drawing Figs.
[52] U.S. Cl. .................................................. 280/289,
  40/129
[51] Int. Cl. ..................................................... B62j 39/00
[50] Field of Search ....................................... 280/289;
  40/129, 129 C; 90/15, 16; 40/125, 10

[56] References Cited
UNITED STATES PATENTS
3,239,957 3/1966 Snediker ...................... 40/129 C
960,442 6/1910 Thurlby ......................... 40/10
1,224,947 5/1917 MacDougall ................. 40/10
Des. 211,922 8/1968 Person ........................... 90/15

OTHER REFERENCES
PUBLICATION AMERICAN BICYCLIST AND MOTOR-CYCLIST page 16 June 1967

Primary Examiner—Kenneth H. Betts
Assistant Examiner—Robert R. Song
Attorney—John R. Walker, III ABSTRACT: A sign-seat brace assembly adapted for installation on a bicycle—the invention including brace structure extending upwardly from the bicycle rear wheel axis and supporting the rear of an elongated bicycle seat. The seat brace structure projecting upwardly mastlike and having generally flat circular sign means elevatingly positioned and arranged behind the back of a bicycle rider. The sign means having a generally taut sheeting or fabric sign-bearing surface. The sign-bearing surface being optionally (1) formed with a luminous bright-colored surface to attract attention and communicate a warning signal; (2) formed with indicia thereon for attracting attention and communicating an intelligible message; or (3) having both a bright-colored surface and indicia formed on the surface for communicating both a warning signal and an intelligible message.

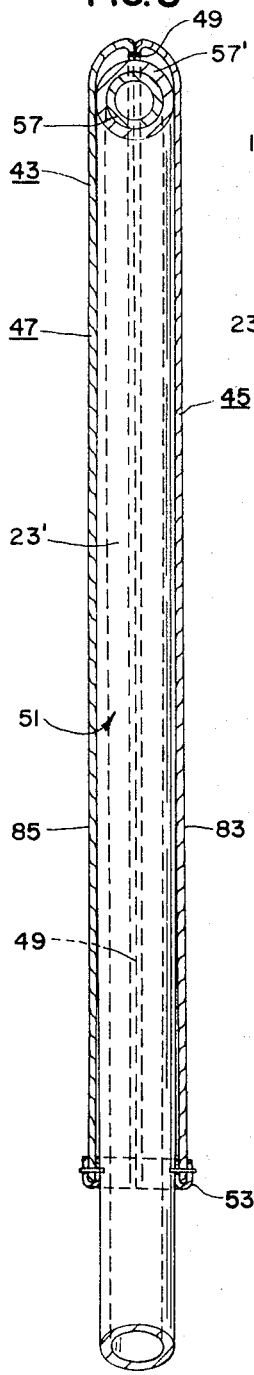
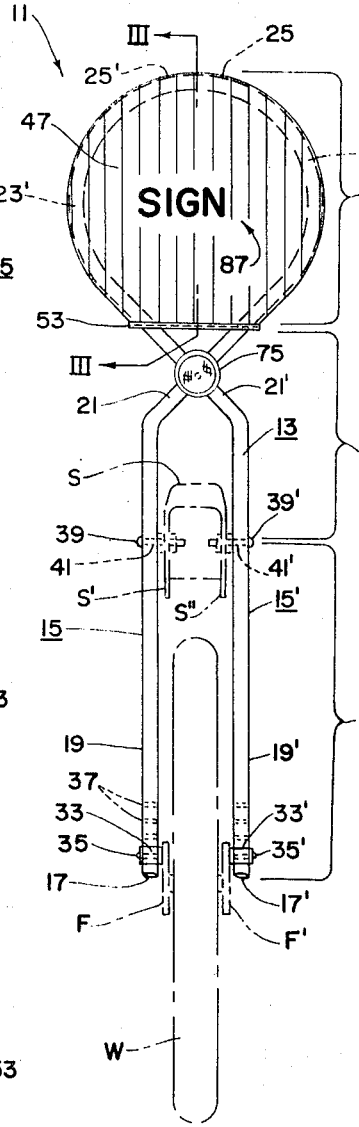
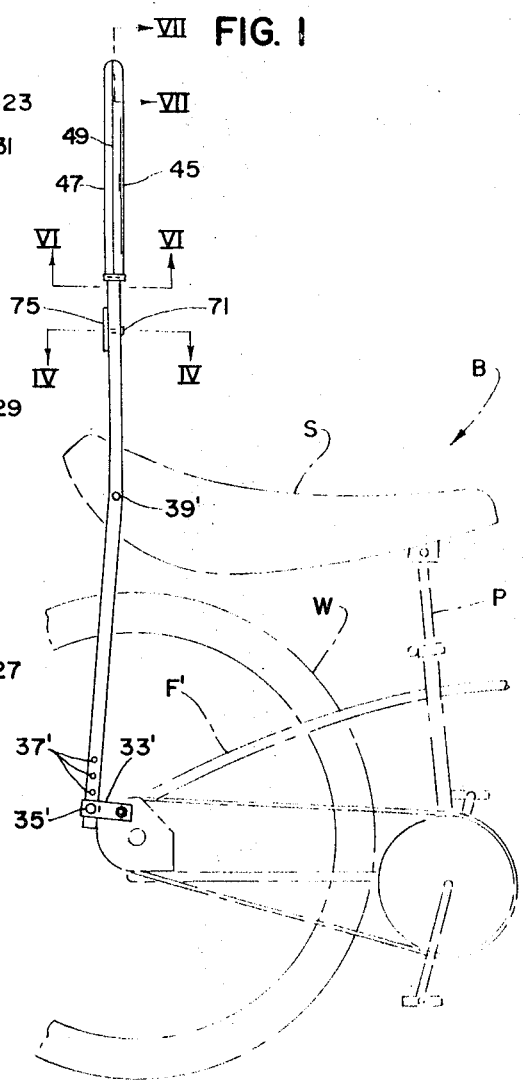
INVENTOR.
MAURICE E. RICH, JR.

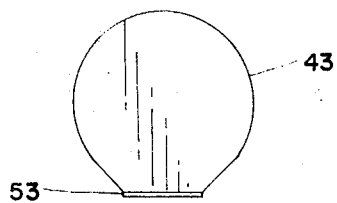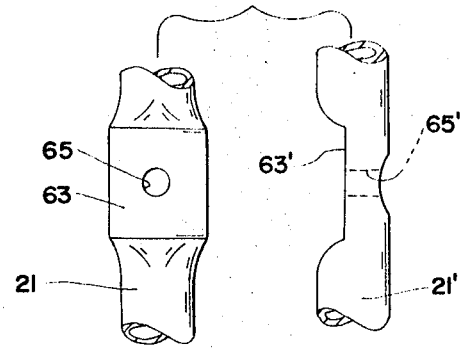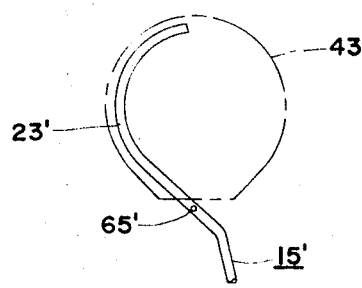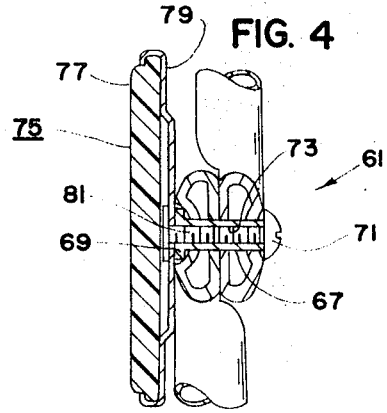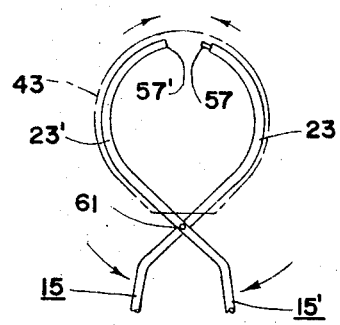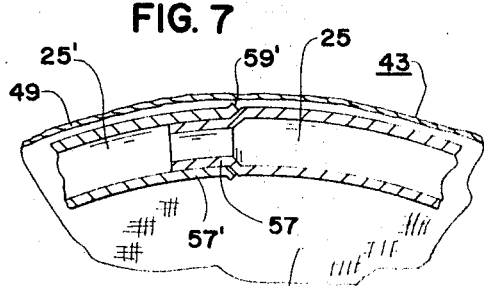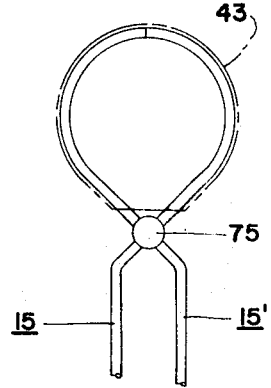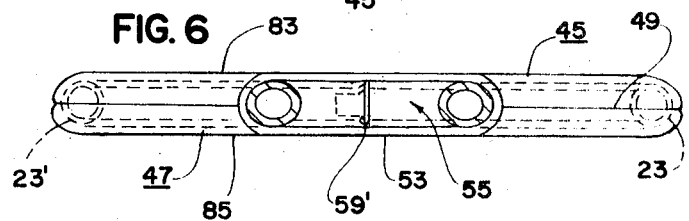

3,586,348

BICYCLE SIGN - SEAT BRACE MEANS

BACKGROUND OF THE INVENTION

1. Field of the Invention

The invention pertains to seat brace means for supporting the rear portion of bicycle seats. It pertains also to vehicular or mobile sign means adapted to be supported on and conveyed by a bicycle.

2. Description of the Prior Art

The typical seat brace means for an elongated bicycle seat of the well-known type which the assignee of the present invention and others presently manufacture and which assignee refers to its seat by the trademark "Banana-seat," is generally an inverted U-shaped continuous bar which supports and extends over the rear section of the seat.

Bicycle-mounted sign means generally fall in two categories: (1) Safety sign means or reflectors for warning a motorist or alerting a motorist to the presence of a bicycle; (2) advertising-type sign means adapted for communicating intelligible messages in advertising. The above first-mentioned safety reflector-type sign means typically are mounted on the rear of a bicycle and oriented rearwardly to reflect the light from the headlamps of approaching automotive vehicles. Typically, such reflector means are in the form of reflector lens colored red for warning an approaching motorist. Also, typically, such reflector lens are of small size and may not properly alert a motorist to the presence of a bicycle. This is particularly so when weather visibility is marginal and in nighttime driving.

Sign means conveying intelligible advertising messages typically are fixedly secured vertically longitudinally on the frame of the bicycle and may not be readily seen or read from the front or rear of the bicycle. The bicycle rider may straddle the sign as it is carried on the bicycle and partially obscure the sign from view. Signboards or the like mounted on the bicycle frame are generally not readily apparent or prominently displayed which reduces the effectiveness of such bicycle-conveyed sign means.

SUMMARY OF THE INVENTION

The sign-seat brace means of the present invention presents a substantially simple but effective means for both supporting the rear of a seat, such as the elongated seat heretofore mentioned, and for prominently effectively displaying a bicycle-mounted sign means. The invention includes substantially large circular sign-bearing surfaces oriented fore and aft relative to the bicycle; the sign-bearing surfaces are arranged at a substantial elevation, approximately shoulder height to a standing person, and are readily apparent to motorists or interested observers. Each sign-bearing surface may be optionally formed with a luminous bright-colored surface to attract attention and communicate a warning signal or the surface may be formed with indicia for attracting attention and communicating an intelligible message. In certain applications of the invention the sign-bearing surface may be provided with indicia formed on a bright-colored luminous background thereby providing the dual function of affording a warning means and also conveying an intelligible message.

BRIEF DESCRIPTION OF THE DRAWING

FIG. 1 is a side elevational view of the sign-seat brace means of the present invention illustrated mounted on a bicycle (the bicycle being shown in broken lines).

FIG. 2 is a rear elevational view of the sign-seat brace means taken as from the left of FIG. 1. The sign portion of the FIG. is lined for the color red.

FIG. 3 is an enlarged sectional view of the sign means of the invention taken as on the line III–III of FIG. 2.

FIG. 4 is a horizontal plane sectional view taken as on the line IV–IV of FIG. 1.

FIG. 5 is a fragmentarily illustrated showing of the sign frame parts illustrated in FIG. 4.

FIG. 6 is a horizontal plane sectional view taken as on the line VI–VI of FIG. 1 and as viewed in an upward direction.

FIG. 7 is a vertical plane sectional view taken as on the line VII–VII of FIG. 1.

FIGS. 8—11 illustrate several consecutive steps of a preferred method of fabricating the sign-seat brace assembly of the invention.

DESCRIPTION OF THE PREFERRED EMBODIMENT

The sign-seat brace means of the present invention is indicated by numeral 11 and is adapted to be mounted on a bicycle B having frame structure F, F' arranged respectively on the left and right sides of rear bicycle wheel W. The bicycle is fitted with an elongated seat S supported at its forward end on a support post P.

Sign-seat brace assembly 11 includes a frame 13 preferably formed of tubular first and second frame members 15, 15' correspondingly arranged in a generally vertical configuration and define the rigid support structure of the assembly. First and second frame members 15, 15' are configured alike but oppositely arranged and include respectively lower terminus portions 17, 17', straight portions 19, 19', oblique portions 21, 21', arced portions 23, 23' and upper terminus portions 25, 25'. Straight portion 19 of frame member 15 projects vertically and merges with oblique portion 21 which in turn merges with arced portion 23. In like manner, straight portion 19' of second frame member 15' merges with oblique portion 21' which in turn merges with arced portion 23'.

For purposes of clarity in description, frame 13 will be considered as being demarcated as indicated in FIG. 2 and as including brace structure 27, mast structure 29, and stay structure 31 unitarily secured together and arranged respectively at the lower, intermediate and upper sections of frame 13. First attaching means including brackets 33, 33' adjustably secure lower terminus portions 17, 17' of frame members 15, 15' to bicycle frame structure F, F'. Threaded fasteners 35, 35' extending respectively through selected ones of apertures 37, 37' of frame members 15, 15' secure frame members 15, 15' on the bicycle frame and provide means for vertical adjustment of sign-seat brace assembly 11. Threaded fasteners 39, 39' extending horizontally respectively through apertures 41, 41' in frame portions 19, 19' and through seat skirt portions S', S" firmly secure bicycle seat S and assembly 11 together.

A cover 43 constructed of fabric or flexible sheeting is fitted over stay structure 31 of frame 13 and provides the sign-bearing surface means of the invention. Cover 43 is formed substantially of parallel arranged front and back sign sheets 45, 47. Seam means 49 extending about a major portion of the periphery of front and back sign sheets 45, 47 secure the peripheral edge portions of the sheets and define a pocketlike interior 51. In the fabrication of cover 43, sign sheets 45, 47 first are arranged in face to face engagement and seam means formed along the peripheral extension of the sheets. After seam means 49 is formed, the cover is then reversed or turned right side out and with seam means 49 arranged in interior 51 (see FIG. 3). A reinforcing binding strip 53 preferably is applied on the lower free edge portions of sign sheets 45, 47 and defines the circumferential mouth opening 55 of the cover. Binding strip 53 snugly encircles downwardly converging oblique portions 21, 21' of frame members 15, 15'. This binding strip reinforces the opening 55, holds the shape of the bottom of the cover, and together with the cover holds the members 23, 23' to prevent separation thereof, as for example, during assembly with the bicycle when the frame members 15, 15' are spread apart. In addition, the binding strip 53 prevents undue strain on the sealed cover at seam means 43 when separating forces are applied to members 23, 23'.

Although frame 13 may be formed from a single piece of tubular stock, the frame is preferably formed of first and second members 15, 15' and includes joint means at upper terminus portions 25, 25' so that the unique method of assembly of my present invention may be carried out, as will be described in the specification. The joint means preferably includes inner and outer sleeve portions 57, 57' telescopically fitted together (see FIG. 7). Outer sleeve portion 57' of frame member 15' preferably is provided with a flared edge 59' for facilitating easy assembly and mating engagement of half joint sleeve portions 57, 57'.

Bolt means 61 extending horizontally through medial portions respectively of obliquely extending frame portions 21, 21' clampingly secure the oblique portions together in an X-configuration (see FIGS. 2, 4 and 5). The confronting front and back side surfaces respectively of oblique frame portions 21, 21' are flattened and indented as at 63, 63' and are provided respectively with apertures 65, 65'. A sleeve nut 67 having a flanged portion 69 is fitted in aligned apertures 65, 65'. A round-headed screw 71 is threadedly engaged with internal threads 73 of sleeve nut 67. Flanged sleeve nut 67 and screw 71 clampingly secure oblique frame portions 21, 21' together and in conjunction with cover 43 unitarily secure assembly 11. Opposite right and left interior surface portions of cover 43 snugly engage arced portions 23, 23' of frame members 15, 15' and secure telescopic joint portions 57, 57' in mating engagement when bolt means 61 is installed.

Sign-seat brace assembly 11 preferably includes reflector lens means 75 mounted on bolt means 61 of frame 13. Reflector means 75 includes a circular reflector lens 77 mounted in circular body 79 which in turn is fixedly secured on a center stud 81. Reflector means 75 is secured on frame bolt means 61 with threaded stud 81 threadedly engaging internal threads 73 of flanged sleeve nut 67. Reflector means 75 may be threadedly disengaged from sleeve nut 67 without affecting the clamping action of bolt means 61 and the rigidity of frame 13; reflector lens means 75 may be optionally threadedly installed on frame 13 by optionally engaging or disengaging stud 81 and flanged sleeve nut 67.

Outside surfaces 83, 85 respectively of front and back sign sheets 45, 47 define respectively front and rear faces of cover 43. Front and back sheets 45, 47 preferably are formed of fabric-backed supported vinyl and with the vinyl material impregnated with a luminous substance for actively reflecting light rays striking the respective surfaces 83, 85. The plastic material forming outside surfaces 83, 85 preferably is impregnated with brightly colored (red or the like) luminous substance which glows in daylight or darkness. In certain applications of the invention, it may be desirable to paint or coat the front and back sign sheets (45, 47) with a luminous paint; whether the luminous material is impregnated in the sheet material or painted on the surface of the sheet material is not of considerable significance and is left to the discretion of the fabricator of the sign-seat brace structure.

Outside surfaces 83, 85 of front and back sheets 45, 47 also may be provided with words, phrases or other indicia for communicating an intelligible message. The word "sign," indicated by numeral 87 in FIG. 2, represents indicia which may be formed on either or both outside surfaces 83, 85 of sheets 45, 47. Back sign sheet surface 85, facing rearwardly of bicycle B, is of course the most important surface of front and back surfaces 83, 85; rearward facing surface 85 is thus the preferred surface for supporting the brightly colored luminous substance or for supporting indicia communicating an intelligible message.

A METHOD OF FABRICATING THE SIGN-SEAT BRACE ASSEMBLY

The assembly of the invention basically includes first and second frame members 15, 15' and fabricated cover member 43. The cover member is preferably fabricated by placing front and back vinyl sign sheets 45, 47 with respective outside surfaces 83, 85 in face to face engagement and then heat sealing by radio frequency current the outside peripheral edge portions in forming the seam means 49. After the outside peripheral edge portions of front and back sheets 45, 47 are seam-secured together, the partially completed cover is turned right side out and binding strip 53 is applied around mouth opening 45.

To assemble first and second frame members 15, 15' and cover 43 the following procedure may be carried out: Arced portions 23, 23' are passed through opening 55 and placed in interior 51 of cover 43, either one at a time or together. One of the portions, i.e., portion 23', is shown in FIG. 9 after being placed in cover 43. The frame members 15, 15' are arranged so that they lie substantially in a common plane with arced portions 23, 23' being in mutual concave confronting relation as shown in FIG. 10. Then, by grasping straight portions 19, 19' of frame members 15, 15' the frame members are joggled to align and engage sleeve portions 57, 57' in mating telescopic engagement and straight portions 19, 19' of frame members 15, 15' are then spread apart thereby tensioning sheets 45, 47 between frame member arced portions 23, 23'. Next, while holding frame member portions 19, 19' in a spread apart configuration, sleeve nut 67 is inserted through apertures 65, 65' of oblique portions 61, 61' and screw 71 threadedly engaged with sleeve nut 67 to clampingly secure oblique portions 21, 21'. The sign-seat brace assembly 11 may then be mounted on a bicycle, in a manner as heretofore described.

I claim:
1. Sign-seat brace means adapted for use with a bicycle having a seat and having bicycle frame structure arranged left and right respectively on opposite sides of the bicycle rear wheel, said combination sign and seat brace means comprising upstanding frame means defined substantially by brace structure, stay structure and mast structure unitarily arranged respectively at the lower, upper and intermediate sections of said frame means, said stay structure being configured generally thin, planar and arranged vertically, said mast structure being generally of upward extension and rigidly interconnecting said brace structure and said stay structure, said brace structure including left and right vertically parallel brace elements corresponding in the direction of horizontal separation with the horizontal direction of extension of said stay structure, first attaching means adapted for relatively stationarily attaching the lower end portions respectively of said left and right brace elements to the bicycle frame structure arranged on opposite sides of the bicycle rear wheel, second attaching means adapted for relatively stationarily securing the upper portions respectively of said left and right brace elements to the left and right side portions of said bicycle seat, flexible sheeting sign-bearing means including a front and a back sign sheet respectively planar arranged over and covering substantially a major portion of the full area enclosed by the peripheral edge boundary of said stay structure, and means firmly positioning said front and back sign sheets respectively over the front and back sides of said stay structure, the oppositely facing outside surfaces respectively of said front and back sign sheets defining respectively front and back oppositely facing faces facing respectively forwardly and rearwardly when said sign-seat brace means is supported on a bicycle; said frame means including first and second tubular frame members configured substantially alike but oppositely arranged, said first frame member including a straight portion extending upwardly and intersecting an oblique portion extending upwardly and toward the right and such portion which intersects an arced portion opening leftward, said second frame member including a straight portion extending upwardly and intersecting an oblique portion extending upwardly and toward the left and which intersects an arced portion opening rightward, and includes horizontal bolt means extending through said oblique portions respectively of said first and second frame members and threadingly clamping the first and second frame members together, said first and second frame members being arranged correspondingly with the oblique portions thereof being X-arranged and with the straight and arced portions respectively of said first and second frame members being arranged respectively symmetrically on the left and right and right and left sides of a vertical plane substantially coinciding with said bolt means, and further with the upper terminal portions respec- tively of said first and second frame members including joint means for matingly endwise fitting the terminal upper end portions of said first and second frame members together.

2. Sign-seat brace means adapted for use with a bicycle having a seat and having bicycle frame structure arranged left and right respectively on opposite sides of the bicycle rear wheel, said combination sign and seat brace means comprising upstanding frame means defined substantially by brace structure, stay structure and mast structure unitarily arranged respectively at the lower, upper and intermediate sections of said frame means, said stay structure being configured generally thin, planar and arranged vertically, said mast structure being generally of upward extension and rigidly interconnecting said brace structure and said stay structure, said brace structure including left and right vertically parallel brace elements corresponding in the direction of horizontal separation with the horizontal direction of extension of said stay structure, first attaching means adapted for relatively stationarily attaching the lower end portions respectively of said left and right brace elements to the bicycle frame structure arranged on opposite sides of the bicycle rear wheel, second attaching means adapted for relatively stationarily securing the upper portions respectively of said left and right brace elements to the left and right side portions of said bicycle seat, flexible sheeting sign-bearing means including a front and a back sign sheet respectively planar arranged over and covering substantially a major portion of the full area enclosed by the peripheral edge boundary of said stay structure, and means firmly positioning said front and back sign sheets respectively over the front and back sides of said stay structure, the oppositely facing outside surfaces respectively of said front and back sign sheets defining respectively front and back oppositely facing faces facing respectively forwardly and rearwardly when said sign-seat brace means is supported on a bicycle; said frame means including first and second tubular frame members configured substantially alike but oppositely arranged, said first frame member including a straight portion extending upwardly and intersecting an oblique portion extending upwardly and toward the right and such portion which intersects an arced portion opening leftward, said second frame member including a straight portion extending upwardly and intersecting an oblique portion extending upwardly and toward the left and which intersects an arced portion opening rightward, and includes horizontal bolt means extending through said oblique portions respectively of said first and second frame members and threadingly clamping the first and second frame members together, said first and second frame members being arranged correspondingly with the oblique portions thereof being X-arranged and with the straight and arced portions respectively of said first and second frame members being arranged respectively symmetrically on the left and right and right and left sides of a vertical plane substantially coinciding with said bolt means, and further with the upper terminal portions respectively of said first and second frame members including joint means for matingly endwise fitting the terminal upper end portions of said first and second frame members together; said joint means for matingly endwise fitting the upper terminal end portion of said first and second frame members together including respectively relatively small and large diametered inner and outer sleeve portions defining substantially mating joint halves adapted to be telescopically fitted together.